(12) United States Patent
Yang et al.

(10) Patent No.: US 9,148,820 B2
(45) Date of Patent: Sep. 29, 2015

(54) IDLE LOAD BALANCING DURING RANDOM ACCESS PROCEDURE

(71) Applicant: Nokia Siemens Networks Oy, Espoo (FI)

(72) Inventors: Roy Yang, Buffalo Grove, IL (US); Weidong Yang, Hoffman Estates, IL (US); Ivan Vukovic, Arlington Heights, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 209 days.

(21) Appl. No.: 13/853,599

(22) Filed: Mar. 29, 2013

(65) Prior Publication Data

US 2014/0293776 A1    Oct. 2, 2014

(51) Int. Cl.
*H04W 28/08* (2009.01)
*H04W 48/10* (2009.01)
*H04W 36/22* (2009.01)

(52) U.S. Cl.
CPC .............. *H04W 28/08* (2013.01); *H04W 48/10* (2013.01); *H04W 36/22* (2013.01)

(58) Field of Classification Search
CPC ...... H04W 28/08; H04W 36/22; H04W 48/10
USPC ......................................... 370/329, 331, 332
See application file for complete search history.

(56) References Cited

U.S. PATENT DOCUMENTS

| 6,567,665 | B1 * | 5/2003 | Kissee ........................... 455/436 |
| 7,941,175 | B1 * | 5/2011 | Hoff et al. ...................... 455/527 |
| 2009/0137251 | A1 | 5/2009 | Ji et al. ........................... 455/437 |
| 2010/0304747 | A1 | 12/2010 | Kazmi et al. .................. 455/436 |
| 2012/0093105 | A1 * | 4/2012 | Park et al. ...................... 370/329 |
| 2012/0106370 | A1 * | 5/2012 | Radulescu et al. ............ 370/252 |
| 2012/0142347 | A1 * | 6/2012 | Morad et al. ............... 455/435.1 |
| 2012/0294142 | A1 * | 11/2012 | Kneckt et al. ................. 370/229 |
| 2013/0028081 | A1 * | 1/2013 | Yang et al. ..................... 370/230 |
| 2013/0035101 | A1 * | 2/2013 | Wang et al. .................... 455/437 |
| 2013/0084864 | A1 * | 4/2013 | Agrawal et al. ............... 455/436 |
| 2014/0098670 | A1 * | 4/2014 | Choi et al. ..................... 370/235 |

FOREIGN PATENT DOCUMENTS

WO    WO 2008/024055 A2    2/2008
WO    WO 2012/172397 A2    12/2012

OTHER PUBLICATIONS

3GPP TS 36.321 V11.1.0 (Dec. 2012), Technical Specification, 3rd Generation Partnership Project: Technical Specification Group Radio Access Network: Evolved Universal Terrestrial Radio Access (E-UTRA); Medium Access Control (MAC) Protocol Specification (Release 11), (57 pages).

* cited by examiner

*Primary Examiner* — Brian D Nguyen
(74) *Attorney, Agent, or Firm* — Harrington & Smith (57) ABSTRACT

A method to balance idle UEs during RA procedures is described. The method includes determining a load condition of a first cell and a load condition of at least one neighbor cell and determining a suitability of the first cell for receiving access attempts from idle mobile devices based on the load conditions of the first cell and of the at least one neighbor cell. The method includes sending an indication of the suitability (for example, in a broadcast message and/or a UE specific message). A UE receives the indication of suitability. The UE selects a target cell from a plurality of cells based at least in part on the indication (for example, in order to select a target cell that is less loaded). The method also includes sending, from the UE, an access attempt to the target cell. Apparatus and computer readable media are also described.

20 Claims, 5 Drawing Sheets

IDLE LOAD BALANCING DURING RANDOM ACCESS PROCEDURE

TECHNICAL FIELD

The exemplary and non-limiting embodiments relate generally to wireless communication systems, methods, devices and computer programs and, more specifically, relate to balancing idle UEs during random access procedures.

BACKGROUND

This section is intended to provide a background or context. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Cells may be densely deployed in traffic hot spot/hot zones such as shopping center, large campus, sports stadium, etc. During an initial random access (RA) procedure a user equipment (UE) in such a densely deployed area is likely to find that signals from multiple cells are strong enough to camp on. The UE is expected to select a cell satisfying cell suitability criteria (such as an absolute or differential RSRP/RSRQ threshold for example) and starts a RA channel (RACH) procedure with the selected cell. However, this requirement does not consider the loading situation/status of the selected cell. Thus, an overloaded cell may be further burdened by UEs attempting to camp on the overloaded cell.

What is needed is a technique for idle UEs to select a cell to camp on that considers the loading situation/status of the cells in the area.

SUMMARY

The below summary section is intended to be merely exemplary and non-limiting.

The foregoing and other problems are overcome, and other advantages are realized, by the use of the exemplary embodiments.

In a first aspect thereof an exemplary embodiment provides a method to balance idle UEs during random access procedures is described. The method includes determining a load condition of a first cell and a load condition of at least one neighbor cell and determining a suitability of the first cell for receiving access attempts from idle mobile devices based on the load condition of the first cell and the load condition of the at least one neighbor cell. The method includes sending an indication of the suitability (for example, in a broadcast message and/or a UE specific message such as a RAR message). A UE receives the indication of suitability. The UE selects a target cell from a plurality of cells based at least in part on the indication (for example, in order to select a target cell that is less loaded). The method also includes sending, from the UE, an access attempt to the target cell.

In a first aspect thereof an exemplary embodiment provides a method for balancing idle mobile devices during random access procedures. The method includes determining a load condition of a first cell and a load condition of at least one neighbor cell and determining a suitability of the first cell for receiving access attempts from idle mobile devices (such as UEs) based on the load condition of the first cell and the load condition of the at least one neighbor cell. The method also includes sending an indication of the suitability.

In another aspect thereof an exemplary embodiment provides a method for balancing idle mobile devices during random access procedures. The method includes receiving, at a mobile device, an indication of suitability of a first cell for receiving access attempts from idle mobile devices. The method also includes selecting a target cell from a plurality of cells based at least in part on the indication and sending, from the mobile device, an access attempt to the target cell.

In a further aspect thereof an exemplary embodiment provides an apparatus for balancing idle mobile devices during random access procedures. The apparatus includes at least one processor; and at least one memory storing computer program code. The at least one memory and the computer program code are configured to, with the at least one processor, cause the apparatus to perform actions. The actions include to determine a load condition of a first cell and a load condition of at least one neighbor cell and to determine a suitability of the first cell for receiving access attempts from idle mobile devices based on the load condition of the first cell and the load condition of the at least one neighbor cell. The actions also include to send an indication of the suitability.

In another aspect thereof an exemplary embodiment provides an apparatus for balancing idle mobile devices during random access procedures. The apparatus includes at least one processor; and at least one memory storing computer program code. The at least one memory and the computer program code are configured to, with the at least one processor, cause the apparatus to perform actions. The actions include to receive an indication of suitability of a first cell for receiving access attempts from idle mobile devices. The actions also include to select a target cell from a plurality of cells based at least in part on the indication and to send, from the mobile device, an access attempt to the target cell.

In a further aspect thereof an exemplary embodiment provides a computer readable medium for balancing idle mobile devices during random access procedures. The computer readable medium is tangibly encoded with a computer program executable by a processor to perform actions. The actions include determining a load condition of a first cell and a load condition of at least one neighbor cell and determining a suitability of the first cell for receiving access attempts from idle mobile devices based on the load condition of the first cell and the load condition of the at least one neighbor cell. The actions also include sending an indication of the suitability.

In another aspect thereof an exemplary embodiment provides a computer readable medium for balancing idle mobile devices during random access procedures. The computer readable medium is tangibly encoded with a computer program executable by a processor to perform actions. The actions include receiving an indication of suitability of a first cell for receiving access attempts from idle mobile devices. The actions also include selecting a target cell from a plurality of cells based at least in part on the indication and sending, from the mobile device, an access attempt to the target cell.

In a further aspect thereof an exemplary embodiment provides an apparatus for balancing idle mobile devices during random access procedures. The apparatus includes means for determining a load condition of a first cell and a load condition of at least one neighbor cell and means for determining a suitability of the first cell for receiving access attempts from idle mobile devices based on the load condition of the first cell and the load condition of the at least one neighbor cell. The apparatus also includes means for sending an indication of the suitability.

In another aspect thereof an exemplary embodiment prosides an apparatus for balancing idle mobile deices during random access procedures. The apparatus includes means for receiving an indication of suitability of a first cell for receiving access attempts from idle mobile devices. The apparatus also includes means for selecting a target cell from a plurality of cells based at least in part on the indication and means for sending, from the mobile device, an access attempt to the target cell.

BRIEF DESCRIPTION OF THE DRAWINGS

The foregoing and other aspects of exemplary embodiments are made more evident in the following Detailed Description, when read in conjunction with the attached Drawing Figures, wherein.

DETAILED DESCRIPTION

Various exemplary embodiments enable a cell that is unsuitable to have UEs camp on it (such as an overloaded cell) to provide information to UEs regarding other cells that are suitable (such as ones that not overloaded, less-loaded, or lest-loaded).

Figure 1:
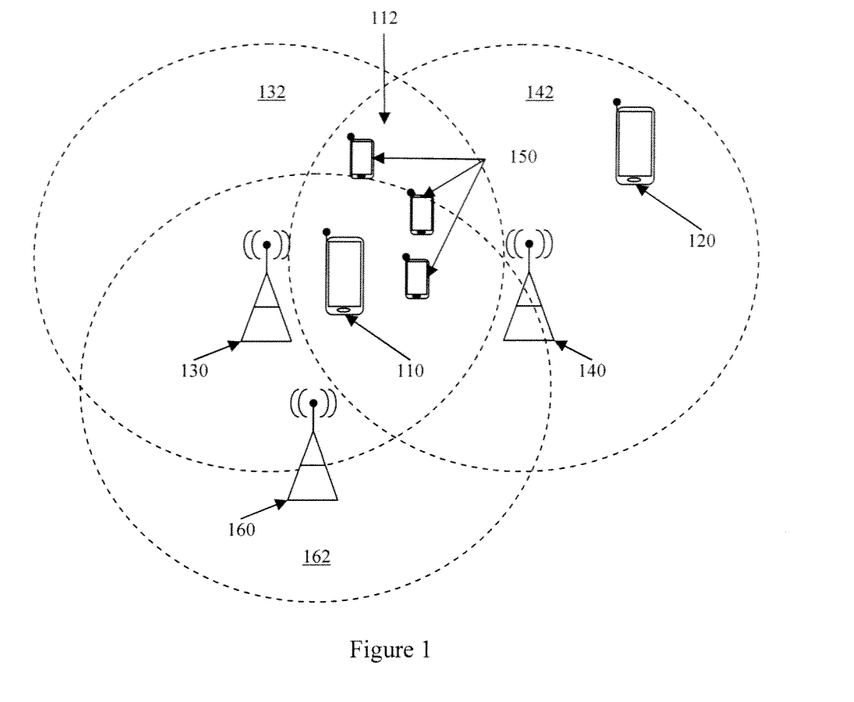
FIG. 1 illustrates an exemplary network that is suitable for use in practicing various exemplary embodiments.

FIG. 1 illustrates an exemplary network that is suitable for use in practicing various exemplary embodiments. The network includes a first UE, UE1 110, and a second UE, UE2 120. An access point (AP) provides a first cell, cell1 AP 130, having an associated coverage area, cell1 coverage area 132; while a second AP provides a second cell, cell2 AP 140, with cell2 coverage area 142. As shown, cell1 coverage area 132 and cell2 coverage area 142 both provide coverage in overlapping coverage area 112. In this non-limiting example, UE1 110 is located in this overlapping coverage area 112.

As illustrated, two cells are shown with coverage areas 132, 142. Additional cells (such as cell 160 having an associated coverage area 162) may also provide coverage areas that overlap with the illustrated coverage areas 112, 132, 142. For example, a plurality of cells may provide coverage for a single geographical location (such as a traffic hot spot, shopping mall, stadium, etc., for example). Additional UEs 150 may also be present in any of the coverage areas (as shown UEs 150 are located in coverage area 112).

Various exemplar embodiments provide a method, apparatus and computer program(s) to balance idle UEs during random access procedures.

This non-limiting example addresses UEs in idle mode. When an eNB cannot distinguish whether a non-dedicated RACH preamble comes an idle mode UE or from a connected mode UE, a connected mode UEs can be instructed to ignore the load balancing instruction intended for idle mode UEs; such that a connected mode UE can stay with its serving cell without being redirected to another cell. In situations when load balancing is intended for all UEs; such separate treatment of connected mode UEs and idle mode UEs may be turned off.

Figure 2:
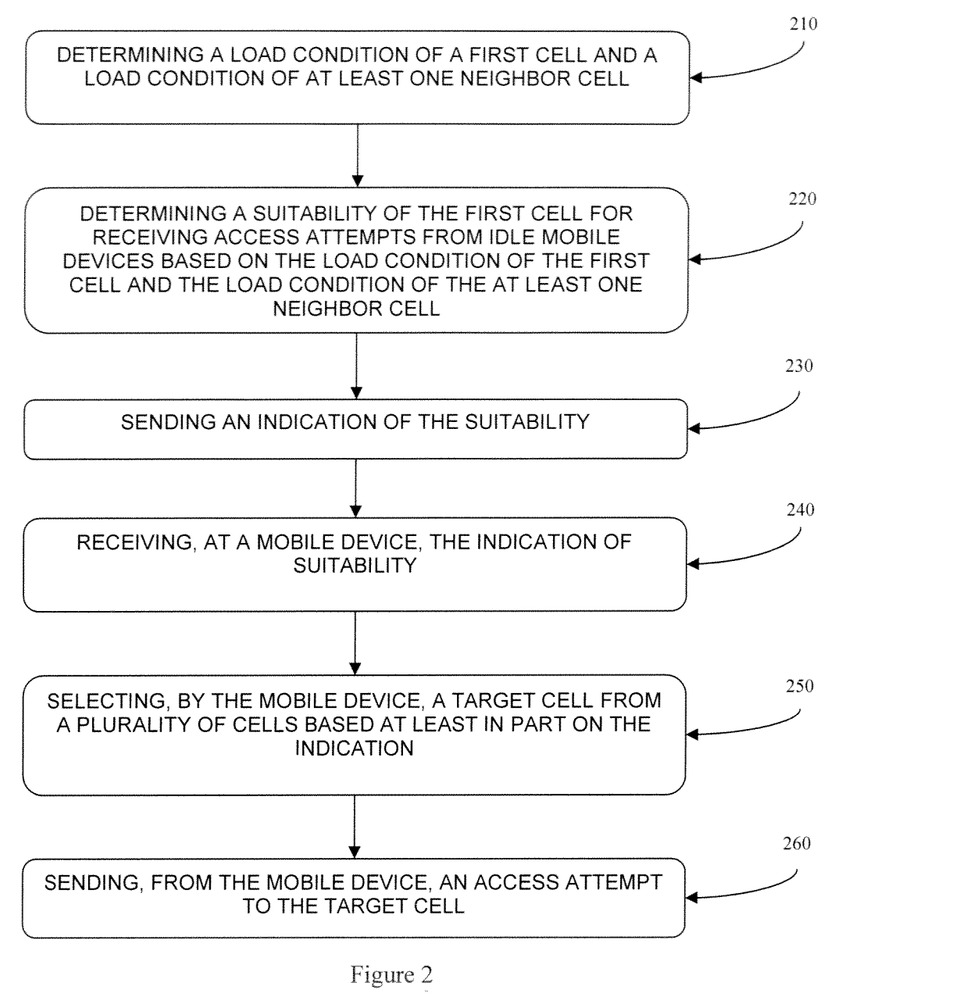
FIG. 2 is a logic flow diagram that illustrates the operation of an exemplary method, and a result of execution of computer program instructions embodied on a computer readable memory, in accordance with various exemplary embodiments.

FIG. 2 logic flow diagram that illustrates the operation of a method, and a result of execution of computer program instructions, in accordance with exemplary embodiments. In accordance with these exemplary embodiments a method performs, at Block 210, a step of determining a load condition of a first cell and a load condition of at least one neighbor cell. At Block 220, the method performs a step of determining a suitability of the first cell for receiving access attempts from idle mobile devices based on the load condition of the first cell and the load condition of the at least one neighbor cell. The method performs a step of sending an indication of the suitability at Block 230. At Block 240, the method performs a step of receiving, at a mobile device, the indication of suitability. A step of selecting a target cell from a plurality of cells based at least in part on the indication is performed by the method at Block 250. At Block 260, the method performs a step of sending, from the mobile device, an access attempt to the target cell.

The various blocks shown in FIG. 2 may be viewed as method steps, and/or as operations that result from operation of computer program code, and/or as a plurality of coupled logic circuit elements constructed to carry out the associated function(s).

In a first exemplary embodiment a cell may broadcast the cell's load condition with potential to influence candidate cells via RSRP/RSRQ thresholds) and/or provide an early notification (with offer of alternative cells) to the UE. The messages are utilized by the cells to solve the problem of idle mode load balancing. In one non-limiting example, the broadcast message including the cell's load condition is in a system information block (SIB). In another non-limning example, the early notification is provided in a random access response (RAR) message).

Use of various exemplary embodiments reduces the utilization levels on already overloaded cells. In conventional systems, the rejection/re-direction techniques use a RRC connection that is established first with the overloaded cell and then the UE may be redirected to another cell in an handover procedure. However, this consumes resources (such as, CPU cycles, bandwidth, etc. . . . ) of the already overloaded cell access point (AP), and also leads to latency in the establishment of a data flow between a LIE and the eNB.

Figure 3:
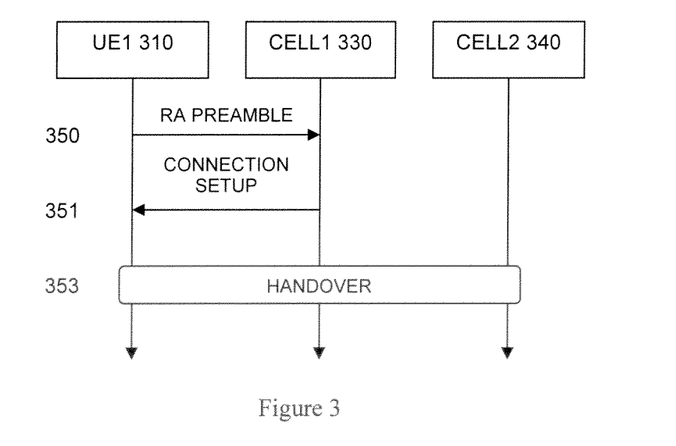
FIG. 3 demonstrates an exemplary signaling diagram.

FIG. 3 demonstrates an exemplary signaling diagram. In this diagram, UE1 310 sends a RA preamble 350 to cell1 330 in order to camp on cell1 330. Even though cell1 330 is overloaded, cell1 330 sends a connection setup response 351 to UE1 310. Once UE1 310 begins accessing camping on cell1 330, cell1 330 determines to shift UE1 310 to cell2 340 (such as for load balancing for example). This transfer of UE1 310 from cell1 330 to cell2 340 is then performed using a handover 353. As noted above, this places additional burdens on resources of the overloaded cell1 330 and leads to latency in the establishment of a data flow between UE1 310 and cell2 340

Figure 4:
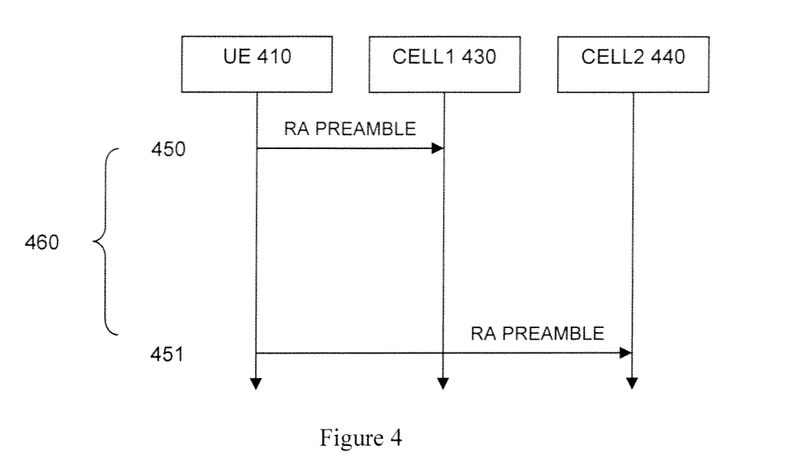
FIG. 4 demonstrates another exemplary signaling diagram.

FIG. 4 demonstrates another exemplary signaling diagram. UE1 410 decides to camp on cell1 430. UE1 410 then sends a RA preamble 450 to cell1 430. However, cell1 430 is overloaded and decides to ignore the RA preamble 450. After the RA response wait period 460 expires, the UE1 410 selects a new cell to camp on cell2 440, and sends a new RA preamble 451 to cell2 440. While this technique does not place much burden on the overloaded cell1 330, the UE1 410 suffers a significant delay in locating a cell to camp on.

Various exemplary embodiments provide a UE that is trying to camp on an intended or current cell with loading information of one or more neighbor cells of the UE. The current cell may provide the UE with the acquired loading information for the neighbor cells of the UE together with the current cell's on loading information. The UE receives the loading information of the current cell and one or more neighbor cells of the UE and the UE itself selects which cell to camp on based on the received loading information.

When cells are densely deployed, many UEs are likely to find that signals from multiple cells are strong enough to camp on during the initial random access procedure, for example, multiple cells may have RSRPs that satisfy cell selection threshold, such as, Srxlev>0). If the strongest cell is heavily loaded and there are other cells in the vicinity that are underloaded and have strong enough signal for the UE to camp on, it is beneficial for the UE to start RACH procedures directly with the under-loaded cell.

Various exemplary embodiments provide methods to direct a UE away from an unsuitable cell (such as one that is overloaded/more-loaded)) and towards suitable cells (such as those that are underloaded/less-loaded) during RA procedures in order to achieve load balancing in the network. Specifically, the overloaded cell may notify the idle mode UE through explicit messaging that the cell is unsuitable and provide a list of suitable candidate cells for the UE.

The unsuitable cell may also provide criteria (e.g., RSRP/RSRQ) which provide conditions for the UE to apply the load indication in a decision on which cell to camp on. After receiving this message and applying the filtering, the UE may select the strongest suitable cell during the cell reselection process to start RACH procedure.

Figure 5:
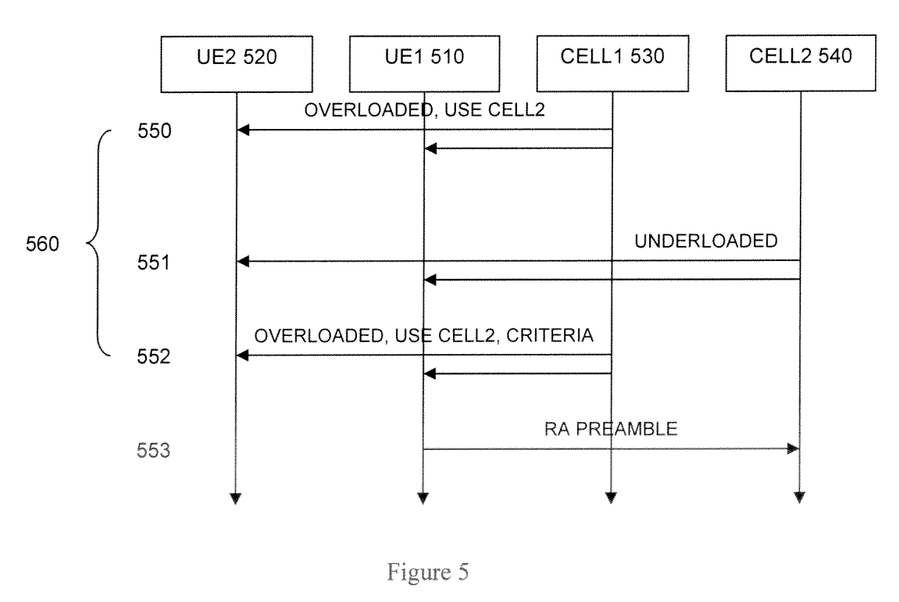
FIG. 5 shows an exemplary signaling diagram in accordance with an exemplary embodiment.

FIG. 5 shows an exemplary signaling diagram in accordance with an exemplary embodiment. In this exemplary embodiment, two UEs, UE1 510 and UE2 520, may receive signals from cell1 530 and cell2 540. Cell1 530 provides a load indication message 550 to all UEs 510, 520, such as in a system information message, a SIB, etc., for example. This load indication message 550 informs the various UEs 510, 520 that cell1 530 is overloaded and provides a suggested cell, cell2 540, that the UEs 510, 520 may consider.

In a non-limiting example, when using a SIB message, besides including the loading (or overload) information on the cell itself (cell1 530) and its neighboring cells (such as cell2 540), the complete information for random access towards selected neighboring cells is also included. Such information for RA may include information concerning RACH/PRACH configurations, PDCCH/EPDCCH, DL bandwidth, etc.

By providing such information for a UE to attach to a neighboring cell (such as cell2 540) in the SIB message of the cell1 530, it is not necessary for the UE 510 to acquire the system information of cell2 540 in a separate procedure, which can lead to a saving in time during the random access procedure. In general, the system information and loading information of a number of cells can be concentrated at one or more cells, so a system wide picture (instead of a cell specific picture) is presented to a UE, which facilitates finding the best match between a UE and cell as early as possible.

In this non-limiting embodiment, load indication messages are periodic and are repeated at regular intervals. Accordingly, cell 1 530 provides another load indication message 552 to all UEs 510, 520 after a load indication message interval 560. As shown, the second load indication message 552 also provides criteria which an idle UE 510, 520 may use in order to determine which cell to camp on.

Cell2 540 also broadcasts a load indication message 551. In this non-limiting embodiment, cell2 540 is capable of taking, more idle UEs (for example, cell2 540 may be underloaded, less-loaded than cell1 530, etc.).

UE1 510 receives the various load indication messages 550, 551, 552. Based on the information provided, decides which cell 530 or 540 to camp on. While cell1 530 may provide a stronger signal, UE1 510 may also factor the loads of the cells 530, 540 in the decision making process.

Here, UE1 510 determines to camp on cell2 540 and sends an RA preamble 553 to cell2 540 directly. This allows the UE1 510 to avoid delays caused by having to be handed over by cell1 530 to cell2 540 or by having to wait for cell1 530 to ignore an RA preamble.

This non-limiting embodiment of FIG. 5 is a cell specific embodiment where the cell announces its load status, idle load balancing candidate cell list and decision criteria to all UEs in the cell. This may be a broadcast message or a multicast message. As a further example, the announcement may be included in a system information message, such as a system information block (SIB) message as one non-limiting example.

Figure 6:
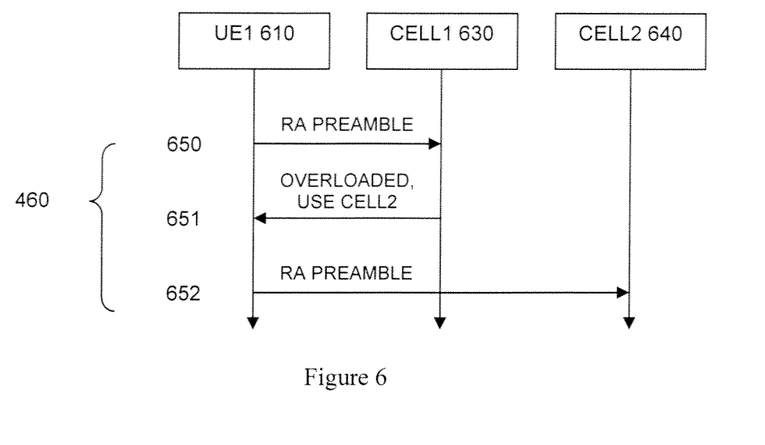
FIG. 6 shows another exemplary signaling diagram in accordance with an exemplary embodiment.

FIG. 6 shows another exemplary signaling diagram in accordance with an exemplary embodiment, UE1 610 may receive signals from cell1 630 and cell2 640. UE1 610 decides to attempt to camp on cell1 630 (for example, based on signal strength). UE1 610 sends an RA preamble 650 to cell1 630. Cell1 630 is overloaded and sends a UE specific message 651 to UE1 610 (such as a RA response (RAR) message for example). This UE specific message 651 informs UE1 610 that cell1 630 is overloaded and provides a suggestion that UE1 610 use cell2 640. Based on this UE specific message 651, UE1 610 decides to camp on cell2 640 and sends a RA preamble 652 to cell2 640.

In contrast to FIG. 4, UE1 610 may receive the UE specific message 651 well before the end of the RA response wait period 460 such that the UE1 610 can quickly send RA preamble 652 to cell2 640 with minimal delay. While cell1 630 will use some resources in order to process the RA preamble 650 and to send the UE specific message 651, this is less of a burden on the overloaded system of cell2 630 than having to establish a connection with UE1 610 and then perform a handover procedure.

This non-limiting embodiment is a UE specific embodiment where the cell provides load status information and the idle load balancing candidate cell list (with or without decision criteria) to a specific UE in the cell. This may be a unicast message (or a multicast message if the same details apply to more than one LIE). As a further example, the announcement may be included in a response message after detecting a message from a UE, such as a RAR message as one non-limiting example.

Figure 7:
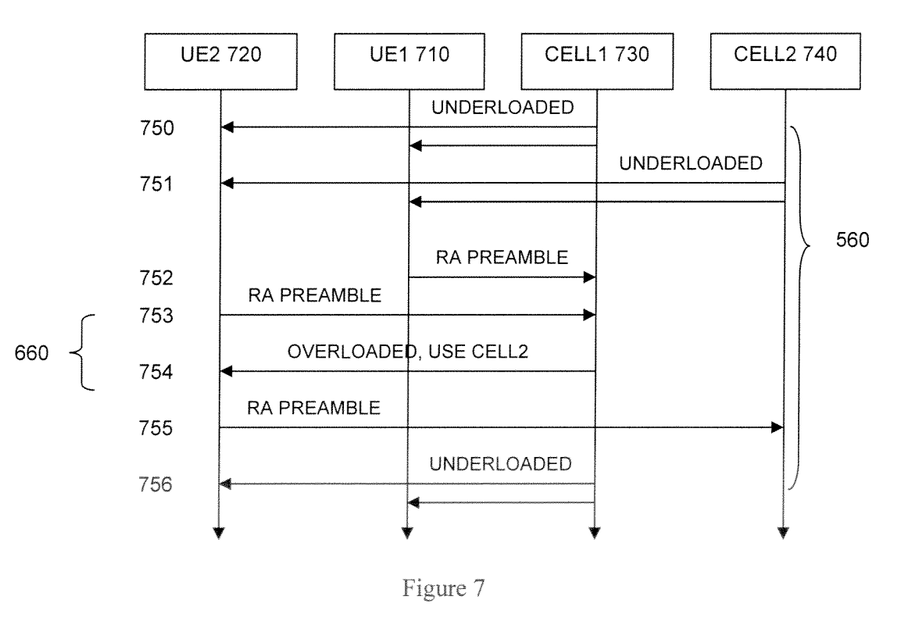
FIG. 7 shows a further exemplary signaling diagram in accordance with an exemplary embodiment.

FIG. 7 shows a further exemplary signaling diagram in accordance with an exemplary embodiment. In this exemplary embodiment, two UEs. UE1 710 and UE2 720, may receive signals from cell1 730 and cell2 740. Both cell1 730 and cell2 740 provide load indication messages 750, 751 which indicate that cell1 730 and cell2 740 are underloaded (or otherwise suitable to have idle UEs camp on their cell).

Based on these messages UE1 710 and UE2 720 each decide to camp on cell1 730. Then UE1 710 sends a RA preamble 752 to cell1 730 and UE2 720 sends a RA preamble 753 to cell1 730.

Cell1 730 determines that having both UE1 710 and UE2 720 camp on it would produce an undesirable situation (such as having cell1 730 be overloaded example) and cell1 730 informs UE2 720 that cell1 730 is overloaded (or otherwise unsuitable UE2) using response message 754 which is sent prior to the elapse of RA response wait period 460.

Note that cell1 730 may use various methods to determine which of UE1 710 and UE2 720 to keep, for example, cell1 730 may accept the first RA preamble 752, 753 received, cell1 730 may accept the RA preamble 752, 753 from the UE 710, 720 with the stronger signal, cell1 730 may accept the RA preamble 752, 753 from the UE 710, 720 with the higher ranked service class, etc.

This response message 754 is specific to UE2 720 and, in this non-limiting example, also instructs UE2 720 to use cell2 740. Based on the response message 754, UE2 720 sends a RA preamble 755 to cell2 740.

At the end of load indication message interval 560, cell1 730 sends a new load indication messages 756. In this non-limiting example, both cell1 730 and cell2 740 have added one idle UE each (LE1 710 on cell1 730 and UE2 720 on cell2 740). Thus, both may again be equally loaded and as such, cell1 730 provides load indication message 756 which indicates that cent 730 is underloaded (or otherwise suitable to have idle UEs camp on their cell) at the end of the load indication message interval 560.

This non-limiting embodiment is a combination embodiment that uses both cell specific and UE specific messaging. Load indication information is separated into public (cell specific) and private (UE specific) parts. This provides the benefits of public awareness and UE specific handling. Additionally, this non-limiting embodiment enables the cell to have the flexibility to handle UE access attempts (such as RA preambles) between broadcasts of public (cell specific) information.

As a non-limiting example, the public information may include the load status information of the cell while the private information may include a suggested candidate cell list (with or without criteria). This allows the cell to tailor the candidate cell list to the UE.

As an additional non-limiting example, the cell may use both the cell specific embodiment and the combination embodiment. For example, if the cell load condition changes between cell specific broadcasts, the cell uses the combination embodiment to handle idle UEs that attempt to camp on the cell once the cell is unsuitable.

As a further non-limiting example, when both idle mode UEs and connected mode UEs are allowed to send contention based PRACH preamble, the eNB may not be able to tell which type of UE provided the preamble. In such a situation, idle load balancing instructions can be made explicitly to preclude connected mode UEs (for example through a flag in the message indicating that only idle UEs listen) or implicitly to handle connected UEs (such as where connected mode UE may, by default, ignore this message unless instructed to listen). Such a flag, which may be provided with the load status information or in a separate message, may be, used to indicate that all UEs are to use the load status information, that on idle UEs are to use load status information, that connected mode UE may ignore the load status information, etc.

In one conventional technique, UEs are provided weighted probabilities for selecting a cell to camp on. In contrast to providing a weighted probability, the various exemplary embodiments provide load suitability information directly to the UEs (as compared to processing load information and other criteria in order to generate the probability). Additionally, a weighted probability does not guarantee the UE select an unsuitable cell (unless the probability for selecting that cell is set to 0%). Thus, unbalanced conditions may still occur and require further steps to process (such as handovers by overburdened cells).

Figure 8:
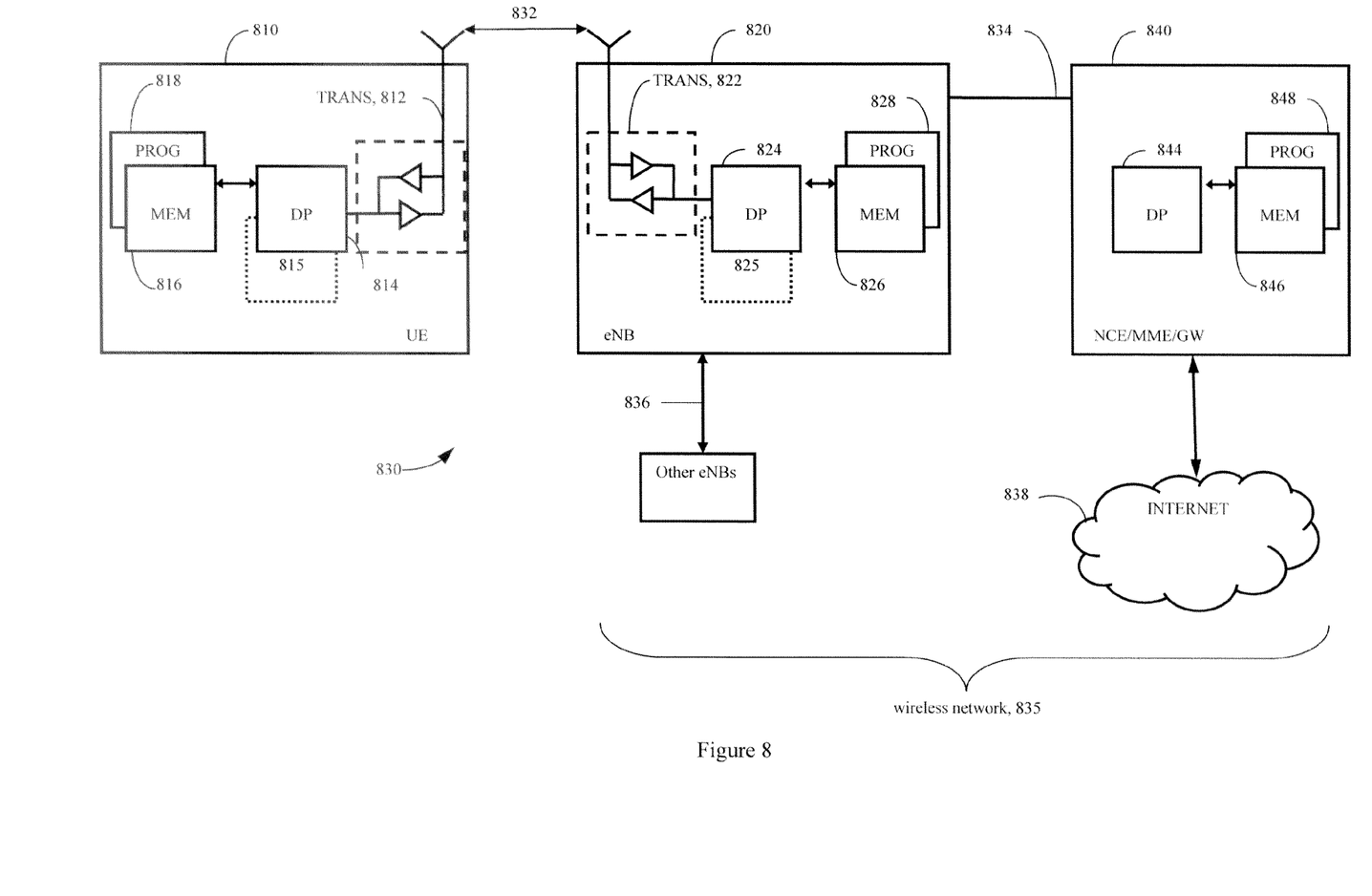
FIG. 8 shows a simplified block diagram of exemplary electronic devices that are suitable for use in practicing various exemplary embodiments.

Reference is made to FIG. 8 for illustrating a simplified block diagram of various electronic devices and apparatus that are suitable for use in practicing exemplary embodiments.

In the wireless system 830 of FIG. 8, a wireless network 835 is adapted for communication over a wireless link 832 with an apparatus, such as a mobile communication device which may be referred to as a UE 810, via a network access node, such as a Node B (base station), and more specifically an eNB 820. The network 835 may include a network control element (NCE) 840 that may include MME/SGW functionality and which provides connectivity a network, such as a telephone network and/or a data communications network (e.g., the internet 838).

The UE 810 includes a controller, such as a computer or a data processor (DP) 814, a computer-readable memory medium embodied as a memory (MEM) 816 that stores a program of computer instructions (PROG) 818, and a suitable wireless interface, such as radio frequency (RF) transceiver 812, for bidirectional wireless communications with the eNB 820 and/or other eNBs via one or more antennas.

The eNB 820 also includes a controller, such as a computer or a data processor (DP) 824, a computer-readable memory medium embodied as a memory (MEM) 826 that stores a program of computer instructions (PROG) 828, and a suitable wireless interface, such as RF transceiver 822, for communication with the UE 810 via one or more antennas. The eNB 820 is coupled via a data/control path 834 to the NCE 840. The path 834 may be implemented as an S1 interface. The eNB 820 may also be coupled to another eNB via data/control path 836, which may be implemented as a X2 interface.

The NCE 840 includes a controller, such as a computer or a data processor (DP) 844, a computer-readable memory medium embodied as a memory (MEM) 846 that stores a program of computer instructions (PROG) 848.

At least one of the PROGs 818, 828 and 848 is assumed to include program instructions that, when executed by the associated DP, enable the device to operate in accordance with exemplary embodiments, as will be discussed below in greater detail.

That is, various exemplary embodiments may be implemented at least in part by computer software executable by the DP 814 of the UE 810; by the DP 824 of the eNB 820; and/or by the DP 844 of the NCE 840, or by hardware, or by a combination of software and hardware (and firmware).

The UE 810 and the eNB 820 may also include dedicated processors, for example RA processor 815 and RA processor 825.

In general, the various embodiments of the UE 810 can include, but are not limited to, cellular telephones, tablets having wireless communication capabilities, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 816, 826 and 846 may be of any type suitable to the local technical environment and may be implemented using any suitable data storage technology, such as semiconductor based memory devices, flash memory, magnetic memory devices and systems, optical memory devices and systems, fixed memory and removable memory. The DPs 814, 824 and 844 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 812 and 822) may be of any type suitable to the local technical environment and may be implemented using any suitable communication technology such as individual transmitters, receivers, transceivers or a combination of such components.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although not limited thereto. While various aspects of the exemplary embodiments may be illustrated and described as block diagrams, flow charts, or using some other pictorial representation, it is well understood that these blocks, apparatus, systems, techniques or methods described herein may be implemented in, as nonlimiting examples, hardware, software, firmware, special purpose circuits or logic, general purpose hardware or controller or other computing devices, or some combination thereof.

An exemplary embodiment provides a method for balancing idle mobile devices during random access procedures. The method includes determining (such as by a processor for example) a load condition of a first cell and a load condition of at least one neighbor cell and determining (such as by a processor for example) a suitability of the first cell for receiving access attempts from idle mobile devices based on the load condition of the first cell and the load condition of the at least one neighbor cell. The method also includes sending (such as by a transmitter for example) an indication of suitability.

In another exemplary embodiment of the method above, the method also includes generating a neighbor cell list. The neighbor cell list includes, for each neighbor cell in the neighbor cell list, an indication of a suitability of the neighbor cell.

In a further exemplary embodiment of any one of the methods above, sending the indication includes broadcasting the indication. The method may also include receiving, at the first cell, an access attempt by a mobile device; and, in response to receiving the access attempt and in response to determining that the first cell is unsuitable for access by the mobile device, sending a neighbor cell list to the mobile device. The neighbor cell list includes, for each neighbor cell in the neighbor cell list, an indication of a suitability of the neighbor cell.

In another exemplary embodiment of any one of the methods above, the method also includes receiving, at the first cell, an access attempt by a mobile device. Sending the indication of the suitability of the first cell includes sending the indication to the mobile device in response to receiving the access attempt and in response to determining that the first cell is unsuitable for access by the mobile device. The indication of the suitability of the first cell further includes a neighbor cell list and the neighbor cell list includes, for each neighbor cell in the neighbor cell list, an indication of a suitability of the neighbor cell.

In a further exemplary embodiment of any one of the methods above, the method also includes sending criteria for selecting a cell from a neighbor cell list. The criteria may include a reference symbol value threshold.

In another exemplary embodiment of any one of the methods above, the load condition includes underloaded, less loaded than the at least one neighbor cell, less loaded than all of the at least one neighbor cell, overloaded, more loaded than the at least one neighbor cell or more loaded than all of the at least one neighbor cell.

In a further exemplary embodiment of any one of the methods above, determining the suitability of the first cell includes, in response to the first cell being less loaded than the at least one neighbor cell, determining, that the first cell is suitable for receiving access attempts from idle mobile devices; and in response to the first cell being more loaded than the at least one neighbor cell, determining that the first cell is unsuitable for receiving access attempts from idle mobile devices.

Another exemplary embodiment provides a method for balancing idle mobile devices during random access procedures. The method includes receiving (such as by a receiver for example), at a mobile device, an indication of suitability of a first cell for receiving access attempts from idle mobile devices. The method also includes selecting (such as by a processor for example) a target cell from a plurality of cells based at least in part on the indication and sending (such as by a transmitter for example), from the mobile device, an access attempt to the target cell.

In a further exemplary embodiment of the method above, receiving the indication includes receiving a broadcast message including the indication. The method may also include sending, to the first cell, a first access attempt and, in response to sending the access attempt, receiving a neighbor cell list from the first cell. The neighbor cell list includes, for each neighbor cell in the neighbor cell list, an indication of a suitability of the neighbor cell. Selecting the target cell is further based on the neighbor cell list.

In another exemplary embodiment of any one of the methods above, the method also includes sending, to the first cell, a first access attempt. Receiving the indication of suitability is performed in response to sending the first access attempt. The indication of the suitability further includes a neighbor cell list and the neighbor cell list includes, for each neighbor cell in the neighbor cell list, an indication of a suitability of the neighbor cell.

In a further exemplary embodiment of any one of the methods above, the method also includes receiving criteria for selecting a cell from a neighbor cell list.

In another exemplary embodiment of any one of the methods above, selecting the target cell from the plurality of cells includes filtering a list of detected cells based on an indication of a suitability of at least one cell in the detected cells.

A further exemplary embodiment provides an apparatus for balancing idle mobile devices during random access procedures. The apparatus includes at least one processor; and at least one memory storing computer program code. The at least one memory and the computer program code are configured to, with the at least one processor, cause the apparatus to perform actions. The actions include to determine a load condition of a first cell and a load condition of at least one neighbor cell and to determine a suitability of the first cell for receiving access attempts from idle mobile devices based on the load condition of the first cell and the load condition of the at least one neighbor cell. The actions also include to send an indication of the suitability.

In another exemplary embodiment of the apparatus above, the actions also include to generate a neighbor cell list. The neighbor cell list includes, for each neighbor cell in the neighbor cell list, an indication of a suitability of the neighbor cell.

In a further exemplary embodiment of any one of the apparatus above, sending the indication includes broadcasting the indication. The actions may also include to receive an access attempt by a mobile device; and, in response to receiving the access attempt and in response to determining that the first cell is unsuitable for access by the mobile device, to send a neighbor cell list to the mobile device. The neighbor cell list includes, for each neighbor cell in the neighbor cell list, an indication of a suitability of the neighbor cell.

In another exemplary embodiment of any one of the apparatus above, the actions also include to receive an access attempt by a mobile device. Sending the indication of the suitability of the first cell includes sending the indication to the mobile device in response to receiving the access attempt and in response to determining that the first cell is unsuitable for access by the mobile device. The indication of the suitability of the first cell further includes a neighbor cell list and the neighbor cell list includes, for each neighbor cell in the neighbor cell list, an indication of a suitability of the neighbor cell.

In a further exemplary embodiment of any one of the apparatus above, the actions also include to send criteria for selecting a cell from a neighbor cell list. The criteria may include a reference symbol value threshold.

In another exemplary embodiment of any one of the apparatus above, the load condition includes underloaded, less loaded than the at least one neighbor cell, less loaded than all of the at least one neighbor cell, overloaded, more loaded than the at least one neighbor cell or more loaded than all of the at least one neighbor cell.

In a further exemplars embodiment of any one of the apparatus above, determining the suitability of the first cell includes, in response to the first cell being less loaded than the at least one neighbor cell, determining that the first cell is suitable for receiving access attempts from idle mobile devices; and in response to the first cell being more loaded than the at least one neighbor cell, determining that the first cell is unsuitable for receiving access attempts from idle mobile devices.

In another exemplary embodiment of any one of the apparatus above, the apparatus is embodied in an integrated circuit.

In a further exemplary embodiment of any one of the apparatus above, the apparatus is embodied in a mobile device.

Another exemplar embodiment pros ides an apparatus for balancing idle mobile devices during random access procedures. The apparatus includes at least one processor; and at least one memory storing computer program code. The at least one memory and the computer program code are configured to, with the at least one processor, cause the apparatus to perform actions. The actions include to receive an indication of suitability of a first cell for receiving access attempts from idle mobile devices. The actions also include to select a target cell from a plurality of cells based at least in part on the indication and to send, from the mobile device, an access attempt to the target cell.

In a further exemplary embodiment of the apparatus above, receiving the indication includes receiving a broadcast message including the indication. The actions may also include to send, to the first cell, a first access attempt and, in response to sending the access attempt, to receive a neighbor cell list from the first cell. The neighbor cell list includes, for each neighbor cell in the neighbor cell list, an indication of a suitability of the neighbor cell. Selecting the target cell is further based on the neighbor cell list.

In another exemplary embodiment of any one of the apparatus above, the actions also include to send, to the first cell, a first access attempt. Receiving the indication of suitability is performed in response to sending the first access attempt. The indication of the suitability further includes a neighbor cell list and the neighbor cell list includes, for each neighbor cell in the neighbor cell list, an indication of a suitability of the neighbor cell.

In a further exemplary embodiment of any one of the apparatus above, the actions also include to receive criteria for selecting a cell from a neighbor cell list.

In another exemplary embodiment of any one of the apparatus above, selecting the target cell from the plurality of cells includes filtering a list of detected cells based on an indication of a suitability of at least one cell in the detected cells.

In a further exemplars embodiment of any one of the apparatus above, the apparatus is embodied in an integrated circuit.

In another exemplary embodiment of one of the apparatus above, the apparatus is embodied in a mobile device.

A further exemplary embodiment provides a computer readable medium for balancing idle mobile devices during random access procedures. The computer readable medium (such as MEM 826 for example) is tangibly encoded with a computer program (such as PROG 828 for example) executable by a processor (such as DP 824 for example) to perform actions. The actions include determining a load condition of a first cell and a load condition of at least one neighbor cell and determining a suitability of the first cell for receiving access attempts from idle mobile devices based on the load condition of the first cell and the load condition of the at least one neighbor cell. The actions also include sending an indication of the suitability.

In another exemplary embodiment of the computer readable medium above, the actions also include generating a neighbor cell list. The neighbor cell list includes, for each neighbor cell in the neighbor cell list, an indication of a suitability of the neighbor cell.

In a further exemplary embodiment of any one of the computer readable media above, sending the indication includes broadcasting the indication. The actions may also include receiving an access attempt by a mobile device; and, in response to receiving the access attempt and in response to determining that the first cell is unsuitable for access by the mobile device, sending a neighbor mobile device. The neighbor cell list includes, for each neighbor cell in the neighbor cell list, an indication of a suitability of the neighbor cell.

In another exemplary embodiment of any one of the computer readable media above, the actions also include receiving an access attempt by a mobile device. Sending the indication of the suitability of the first cell includes sending the indication to the mobile device in response to receiving the access attempt and in response to determining that the first cell is unsuitable for access by the mobile device. The indication of the suitability of the first cell further includes a neighbor cell list and the neighbor cell list includes, for each neighbor cell in the neighbor cell list, an indication of a suitability of the neighbor cell.

In a further exemplary embodiment of any one of the computer readable media above, the actions also include sending criteria for selecting a cell from a neighbor cell list. The criteria may include a reference symbol value threshold.

In another exemplary embodiment of any one of the computer readable media above, the load condition includes underloaded, less loaded than the at least one neighbor cell, less loaded than all of the at least one neighbor cell, overloaded, more loaded than the at least one neighbor cell or more loaded than all of the at least one neighbor cell.

In a further exemplary embodiment of any one of the computer readable media above, determining the suitability of the first cell includes, in response to the first cell being less loaded than the at least one neighbor cell, determining that the first cell is suitable for receiving access attempts from idle mobile devices; and in response to the first cell being more loaded than the at least one neighbor cell, determining that the first cell is unsuitable for receiving access attempts from idle mobile devices.

In another exemplary embodiment of any one of the computer readable media above, the computer readable medium is a storage medium.

In a further exemplary embodiment of any one of the computer readable media above, the computer readable medium is a non-transitory computer readable medium (e.g., CD-ROM, RAM, flash memory, etc.)

Another exemplary embodiment provides a computer readable medium for balancing idle mobile devices during random access procedures. The computer readable medium (such as MEM 816 for example) is tangibly encoded with a computer program (such as PROG 818 for example) executable by a processor (such as DP 814 for example) to perform actions. The actions include receiving an indication of suitability of a first cell for receiving access attempts from idle mobile devices. The actions also include selecting a target cell from a plurality of cells based at least in part on the indication and sending, from the mobile device, an access attempt to the target cell.

In a further exemplary embodiment of the computer readable medium above, receiving the indication includes receiving a broadcast message including the indication. The actions may also include sending, to the first cell, a first access attempt and, in response to sending the access attempt, receiving a neighbor cell list from the first cell. The neighbor cell list includes, for each neighbor cell in the neighbor cell list, an indication of a suitability of the neighbor cell. Selecting the target cell is further based on the neighbor cell list.

In another exemplary embodiment of any one of the computer readable media above, the actions also include sending, to the first cell, a first access attempt. Receiving the indication of suitability is performed in response to sending the first access attempt. The indication of the suitability further includes a neighbor cell list and the neighbor cell list includes, for each neighbor cell in the neighbor cell list, an indication of a suitability of the neighbor cell.

In a further exemplary embodiment of any one of the computer readable media above, the actions also include receiving criteria for selecting a cell from a neighbor cell list.

In another exemplary embodiment of any one of the computer readable media above, selecting the target cell from the plurality of cells includes filtering a list of detected cells based on an indication of a suitability of at least one cell in the detected cells.

In a further exemplary embodiment of any one of the computer readable media above, the computer readable medium is a storage medium.

In another exemplary embodiment of any one of the computer readable media above, the computer readable medium is a non-transitory computer readable medium (e.g., CD-ROM. RAM, flash memory, etc.)

A further exemplary embodiment provides an apparatus for balancing idle mobile devices during random access procedures. The apparatus includes means for determining (such as a processor for example) a load condition of a first cell and a load condition of at least one neighbor cell and means for determining, (such as a processor for example) a suitability of the first cell for receiving access attempts from idle mobile devices based on the load condition of the first cell and the load condition of the at least one neighbor cell. The apparatus also includes means for sending (such as a transmitter for example) an indication of the suitability.

In another exemplary embodiment of the apparatus above, the apparatus also includes means for generating a neighbor cell list. The neighbor cell list includes, for each neighbor cell in the neighbor cell list, an indication of a suitability of the neighbor cell.

In a further exemplary embodiment of any one of the apparatus above, the sending means includes means for broadcasting the indication. The apparatus may also include means for receiving an access attempt by a mobile device; and means for sending a neighbor cell list to the mobile device in response to receiving the access attempt and in response to determining that the first cell is unsuitable for access by the mobile device. The neighbor cell list includes, for each neighbor cell in the neighbor cell list, an indication of a suitability of the neighbor cell.

In another exemplary embodiment of any one of the apparatus above, the apparatus also includes means for receiving an access attempt by a mobile device. The sending means includes means for sending the indication to the mobile device in response to receiving the access attempt and in response to determining that the first cell is unsuitable for access by the mobile device. The indication of the suitability of the first cell further includes a neighbor cell list and the neighbor cell list includes, for each neighbor cell in the neighbor cell list, an indication of a suitability of the neighbor cell.

In a further exemplary embodiment of any one of the apparatus above, the apparatus also includes means for sending criteria for selecting a cell from a neighbor cell list. The criteria may include a reference symbol value threshold.

In another exemplary embodiment of any one of the apparatus above, the load condition is underloaded, less loaded than the at least one neighbor cell, less loaded than all of the at least one neighbor cell, overloaded, more loaded than the at least one neighbor cell or more loaded than all of the at least one neighbor cell.

In a further exemplary embodiment of any one of the apparatus above, the suitability of the first cell determining means includes means for determining that the first cell is suitable for receiving access attempts from idle mobile devices in response to the first cell being less loaded than the at least one neighbor cell; and means for determining that the first cell is unsuitable for receiving access attempts from idle mobile devices in response to the first cell being more loaded than the at least one neighbor cell.

Another exemplary embodiment provides an apparatus for balancing idle mobile devices during random access procedures. The apparatus includes means for receiving (such as a receiver for example) an indication of suitability of a first cell for receiving access attempts from idle mobile devices. The apparatus also includes means for selecting (such as a processor for example) a target cell from a plurality of cells based at least in part on the indication and means for sending (such as a transmitter for example), from the mobile device, an access attempt to the target cell.

In a further exemplary embodiment of the apparatus above, the receiving means includes means for receiving a broadcast message including the indication. The apparatus may also include means for sending, to the first cell, a first access attempt and means for receiving a neighbor cell list from the first cell in response to sending the access attempt. The neighbor cell list includes, for each neighbor cell in the neighbor cell list, an indication of a suitability of the neighbor cell. Selecting the target cell is further based on the neighbor cell list.

In another exemplary embodiment of any one of the apparatus above, the apparatus also includes sending, to the first cell, a first access attempt. Receiving the indication of suitability is performed in response to sending first access attempt. The indication of the suitability further includes a neighbor cell list and the neighbor cell list includes, for each neighbor cell in the neighbor cell list, an indication suitability of the neighbor cell.

In a further exemplary embodiment of any one of the apparatus above, the apparatus also includes means for receiving criteria for selecting a cell from a neighbor cell list.

In another exemplary embodiment of any one of the apparatus above, the selecting means includes means for filtering a list of detected cells based on an indication of a suitability of at least one cell in the detected cells.

It should thus be appreciated that at least some aspects of the exemplary embodiments may be practiced in various components such as integrated circuit chips and modules, and that the exemplary embodiments may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments.

Various modifications and adaptations to the foregoing exemplary embodiments may become apparent to those skilled in the relevant arts in view of the foregoing description, when read in conjunction with the accompanying drawings. However, any and all modifications will still fall within the scope of the non-limiting and exemplary embodiments.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further the various names assigned to different channels (e.g., RACH etc.) are not intended to be limiting in any respect, as these various be identified by any suitable names.

Furthermore, some of the features of the various non-limiting and exemplary embodiments may be used to advantage without the corresponding use of other features. As such, the foregoing description should be considered as merely illustrative of the principles, teachings and exemplary embodiments, and not in limitation thereof.

The following abbreviations that may be found in the specification and/or the drawing figures are defined as follows:

AP access point (such as a BS, eNB, relay node, etc.)
BS basestation
DL downlink (eNB towards UE)
eNB E-UTRAN Node B (evolved Node B)
EPDCCH enhanced physical downlink control channel
E-UTRAN evolved UTRAN (LTE)
HO handover
LTE long term evolution of UTRAN (E-UTRAN)
MM/MME mobility management/mobility management entity
Node B base station
PDCCH physical downlink control channel
RA random access
RACH random access channel
RSRP reference symbol received power
RSRQ reference symbol received quality
S-GW serving gateway
SIB system identity block
Srxlev cell selection RX level value
UE user equipment, such as a mobile station or mobile terminal
UL uplink (UE towards eNB)
UTRAN universal terrestrial radio access network

What is claimed is:

1. A method comprising:
   in a first cell in a radio access network, determining a load condition of the first cell and a load condition of at least one neighbor cell;
   determining a suitability of the first cell for receiving access attempts from idle mobile devices during random access, based on the load condition of the first cell and the load condition of the at least one neighbor cell; and
   sending an indication of the suitability to the idle mobile devices using a system information block or a random access response.

2. The method of claim 1, further comprising generating a neighbor cell list, where the neighbor cell list comprises, for each neighbor cell in the neighbor cell list, an indication of a suitability of the neighbor cell.

3. The method of claim 1, where sending the indication comprises broadcasting the indication.

4. The method of claim 3, further comprising:
   receiving, at the first cell, an access attempt by a mobile device; and
   in response to receiving the access attempt and in response to determining that the first cell is unsuitable for access by the mobile device, sending a neighbor cell list to the mobile device,
   where the neighbor cell list comprises, for each neighbor cell in the neighbor cell list, an indication of a suitability of the neighbor cell.

5. The method of claim 1, further comprising:
   receiving, at the first cell, an access attempt by a mobile device,
   where sending the indication of the suitability of the first cell comprises sending the indication to the mobile device in response to receiving the access attempt and in response to determining that the first cell is unsuitable for access by the mobile device,
   where the indication of the suitability of the first cell further comprises a neighbor cell list and
   where the neighbor cell list comprises, for each neighbor cell in the neighbor cell list, an indication of a suitability of the neighbor cell.

6. The method of claim 1, further comprising sending criteria for selecting a cell from a neighbor cell list.

7. The method of claim 6, where the criteria comprises reference symbol value threshold.

8. The method of claim 1, where the load condition comprises one of: underloaded, less loaded than the at least one neighbor cell, less loaded than all of the at least one neighbor cell, overloaded, more loaded than the at least one neighbor cell, and more loaded than all of the at least one neighbor cell.

9. The method of claim 1, where determining the suitability of the first cell comprises:
- in response to the first cell being less loaded than the at least one neighbor cell, determining that the first cell is suitable for receiving access attempts from idle mobile devices; and
- in response to the first cell being more loaded than the at least one neighbor cell, determining that the first cell is unsuitable for receiving access attempts from idle mobile devices.

10. A method comprising:
- receiving, from a first cell at a mobile device during random access, a system information block or a random access response comprising an indication of suitability of the first cell for receiving access attempts from idle mobile devices;
- selecting a target cell from a plurality of cells based at least in part on the indication; and
- sending, from the mobile device, an access attempt to directly the target cell.

11. The method of claim 10, where receiving the indication comprises receiving a broadcast message comprising the indication.

12. The method of claim 11, further comprising:
- sending, to the first cell, a first access attempt; and
- in response to sending the access attempt, receiving a neighbor cell list from the first cell,
- where the neighbor cell list comprises, for each neighbor cell in the neighbor cell list, an indication of a suitability of the neighbor cell, and
- where selecting the target cell is further based on the neighbor cell list.

13. The method of claim 10, further comprising:
- sending, to the first cell, a first access attempt;
- where receiving the indication of suitability is performed in response to sending the first access attempt,
- where the indication of the suitability further comprises a neighbor cell list and
- where the neighbor cell list comprises, for each neighbor cell in the neighbor cell list, an indication of a suitability of the neighbor cell.

14. The method of claim 10, further comprising receiving criteria for selecting a cell from a neighbor cell list.

15. The method of claim 10, where selecting the target cell from the plurality of cells comprises filtering a list of detected cells based on an indication of a suitability of at least one cell in the detected cells.

16. An apparatus, comprising at least one processor; and at least one memory including computer program code, the at least one memory and the computer program code configured to, with the at least one processor, cause the apparatus to perform at least the following:
- in a first cell in a radio access network, to determine a load condition of the first cell and a load condition of at least one neighbor cell;
- to determine a suitability of the first cell for receiving access attempts from idle mobile devices during random access, based on the load condition of the first cell and the load condition of the at least one neighbor cell; and
- to send an indication of the suitability to the idle mobile devices using a system information block or a random access response.

17. The apparatus of claim 16, where, when sending the indication, the at least one memory and the computer program code are further configured to cause the apparatus to broadcast the indication.

18. The apparatus of claim 17, where the at least one memory and the computer program code are further configured to cause the apparatus:
- to receive, at the first cell, an access attempt by a mobile device; and
- in response to receiving the access attempt and in response to determining that the first cell is unsuitable for access by the mobile device, to send a neighbor cell list to the mobile device,
- where the neighbor cell list comprises, for each neighbor cell in the neighbor cell list, an indication of a suitability of the neighbor cell.

19. The apparatus of claim 16, where the at least one memory and the computer program code are further configured to cause the apparatus:
- to receive, at the first cell, an access attempt by a mobile device,
- where, sending the indication of the suitability of the first cell, the at least one memory and the computer program code are further configured to cause the apparatus to send the indication to the mobile device in response to receiving the access attempt and in response to determining that the first cell is unsuitable for access by the mobile device,
- where the indication of the suitability of the first cell further comprises a neighbor cell list and
- where the neighbor cell list comprises, for each neighbor cell in the neighbor cell list, an indication of a suitability of the neighbor cell.

20. An apparatus, comprising at least one processor; and at least one memory including computer program code, the at least one memory and the computer program code configured to, with the at least one processor, cause the apparatus to perform at least the following:
- to receive, from a first cell at a mobile device during random access, a system information block or a random access response comprising an indication of suitability of the first cell for receiving access attempts from idle mobile devices;
- to select a target cell from a plurality of cells based at least in part on the indication; and
- to send, from the mobile device, an access attempt to directly the target cell.

* * * * *